Figure 1:
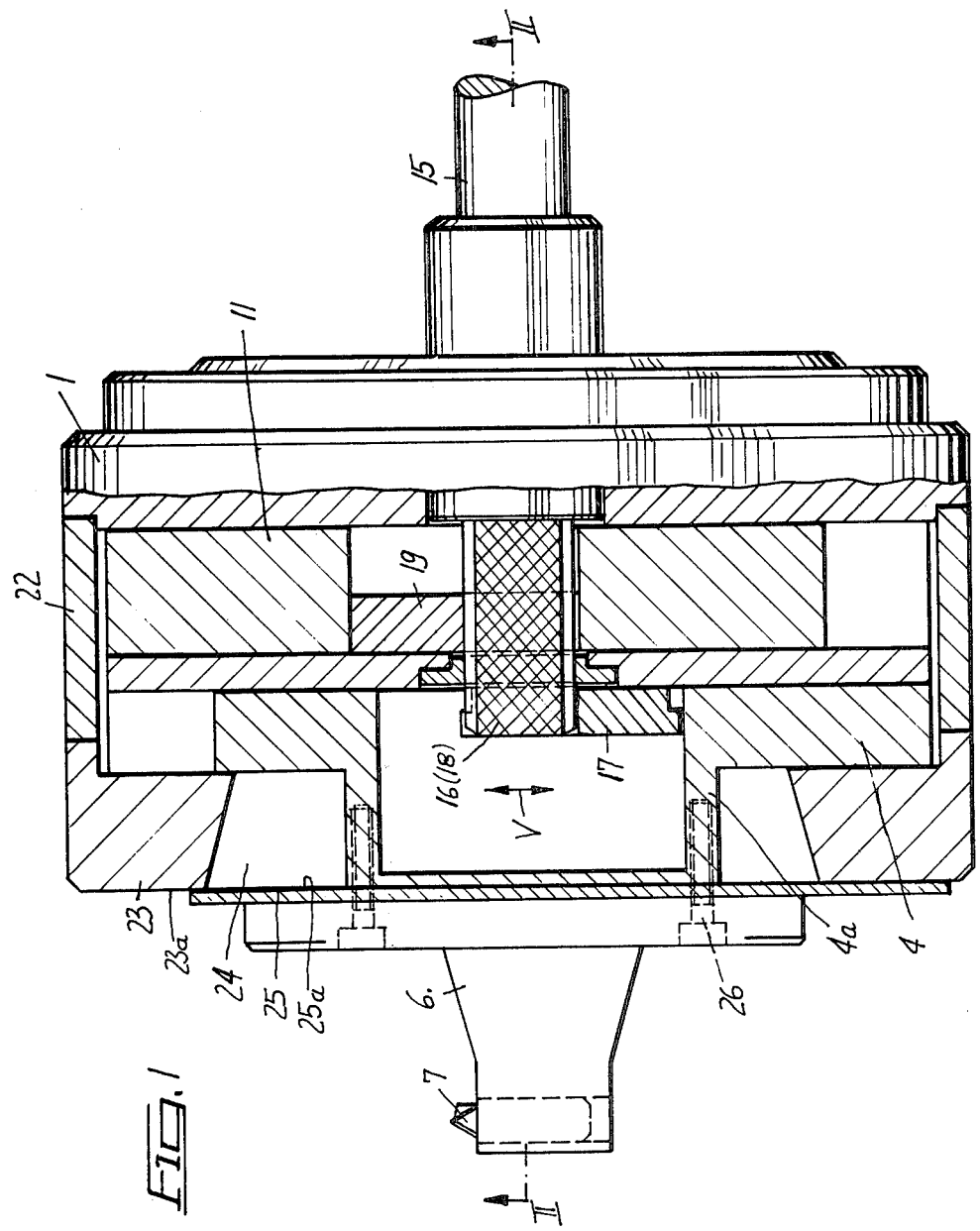

United States Patent [19]

Eckle

[11] 4,184,391
[45] Jan. 22, 1980

[54] FACING AND BORING HEAD

[75] Inventor: Otto Eckle, Löchgau, Fed. Rep. of Germany

[73] Assignee: Komet Stahlhalter- und Werkzeugfabrik Robert Breuning GmbH, Besigheim, Fed. Rep. of Germany

[21] Appl. No.: 907,750

[22] Filed: May 19, 1978

[30] Foreign Application Priority Data

Jun. 28, 1977 [DE] Fed. Rep. of Germany ... 7720194[U]

[51] Int. Cl.$^2$ .......................... B23B 41/00; B23B 3/00
[52] U.S. Cl. ........................................ 82/1.2; 82/2 E
[58] Field of Search ................................... 82/1.2, 2 E

[56] References Cited

U.S. PATENT DOCUMENTS

| 3,067,637 | 12/1962 | Horning | 82/1.2 |
| 3,180,187 | 4/1965 | McFerren | 82/2 E X |
| 4,040,315 | 8/1977 | Bellingham | 82/2 E |
| 4,067,251 | 1/1978 | Eckle et al. | 82/1.2 |

Primary Examiner—Harrison L. Hinson
Attorney, Agent, or Firm—Blanchard, Flynn, Thiel, Boutell & Tanis

[57] ABSTRACT

A facing and boring head includes a supporting member in the form of a circular disc secured at its back to the spindle of a lathe or the like. A slide is displaceable radially at the front of the supporting member in a guide extending perpendicularly and symmetrically with respect to the axis of rotation and provides for securement of a tool holder thereto. A counterweight is displaceable in the opposite radial direction between the front of the supporting member and the slide. The mass of the counterweight corresponds to that of the slide, including the tool holder and tool. A gear causes an opposite and equal radial movement of the slide and counterweight, depending on a positioning element. A cylindrical housing surrounds the slide, the counterweight, their guides and the gear. The housing is flanged-mounted on the supporting member. The housing includes at its front adjacent to the tool holder, a cover with a plane end face and an elongated slot extending in the displacement direction of the slide for the passage of a portion of the slide. A cover plate is provided on such portion of the slide and covers the elongated slide completely and bears with a plane face against the end face of the cover.

5 Claims, 2 Drawing Figures

FACING AND BORING HEAD

FIELD OF THE INVENTION

The invention relates to a facing and boring head.

BACKGROUND OF THE INVENTION

Such a facing and boring head includes a supporting member in the form of a circular disc to be secured by its back to the spindle of a lathe or the like, a slide which is displaceable radially at the front of the supporting member in a guide extending perpendicularly and symmetrically with respect to the axis of rotation and to which a tool holder can be secured, a counterweight which is displaceable in the opposite radial direction between the front of the supporting member and the slide and the mass of which corresponds to that of the slide including tool holder and tool, and a gear which causes an opposite and equal radial movement of slide and counterweight depending on a positioning element.

With such a facing and boring head, the tool holder is displaced radially while the facing and boring head rotates at high speed. In the course of this, the counterweight, which is moved simultaneously in the opposite direction, causes a balancing of the masses so that oscillations are avoided and the machining accuracy is increased. In order to achieve as great a working accuracy as possible, the slide is guided within narrow limits in its guide. In order to ensure the easy running of all parts, on which the working accuracy also depends, the guides of the slide and of the counterweight and also the gear have to be constantly lubricated. Such a constant lubrication is mainly necessary because the lubricating oil is slung radially outwards by the high speed of rotation of the facing and boring head. This leads to severe soiling of the machine. In addition, coolant and turnings can reach the open guides of slide and counterweight as a result of which these parts are subjected to wear and corrosion which likewise has an adverse effect on the easy running.

SUMMARY OF THE INVENTION

The object of the invention is to improve a facing and boring head of the kind referred to at the beginning so that the lubricating oil can no longer emerge from the facing and boring head unintentionally, on the other hand coolant, turnings and dust can no longer reach the sensitive guides of slide and counterweight and so the working accuracy and the life are increased.

According to the invention, this is achieved in that a cylindrical housing, which surrounds the slide, the counterweight, their guides and the gear, is flange-mounted on the supporting member, that the housing comprises, at its front adjacent to the tool, a cover with a plane end face and an elongated slot extending in the direction of displacement of the slide for the passage of a portion of the slide and that a cover plate, which covers the elongated slot completely and bears with a plane face against the end face of the cover is provided on the portion of the slide.

The housing and its cover surround all the important parts of the facing and boring head. Consequently, the lubricating oil can no longer be slung to the outside but collects inside the housing. From there it can be removed from time to time by providing an appropriate outlet bore. The cover plate bearing tightly against the end face of the cover likewise prevents lubricating oil from emerging at the front of the facing and boring head, in all positions of the slide. While the slide is being displaced radially, the cover plate slides over the end face of the cover and covers the slot necessary for the movement of the portion of the slide passing through the cover. Lubricating oil which reaches the contact region between the plane face of the cover plate and the end face, through this slot, not only lubricates both parts but also forms a kind of sealing means which prevents the penetration of coolant, dust and turnings into the facing and boring head. Since all the other important parts of the facing and boring head are surrounded by the cover and its housing, coolant, dust and turnings cannot reach the slide, the counterweight, their guides and the gear. Thus all these parts are protected and a high working accuracy is ensured simultaneously with a long life of these parts.

Further advantageous developments of the invention are characterised in the sub-claims.

Figure 2:
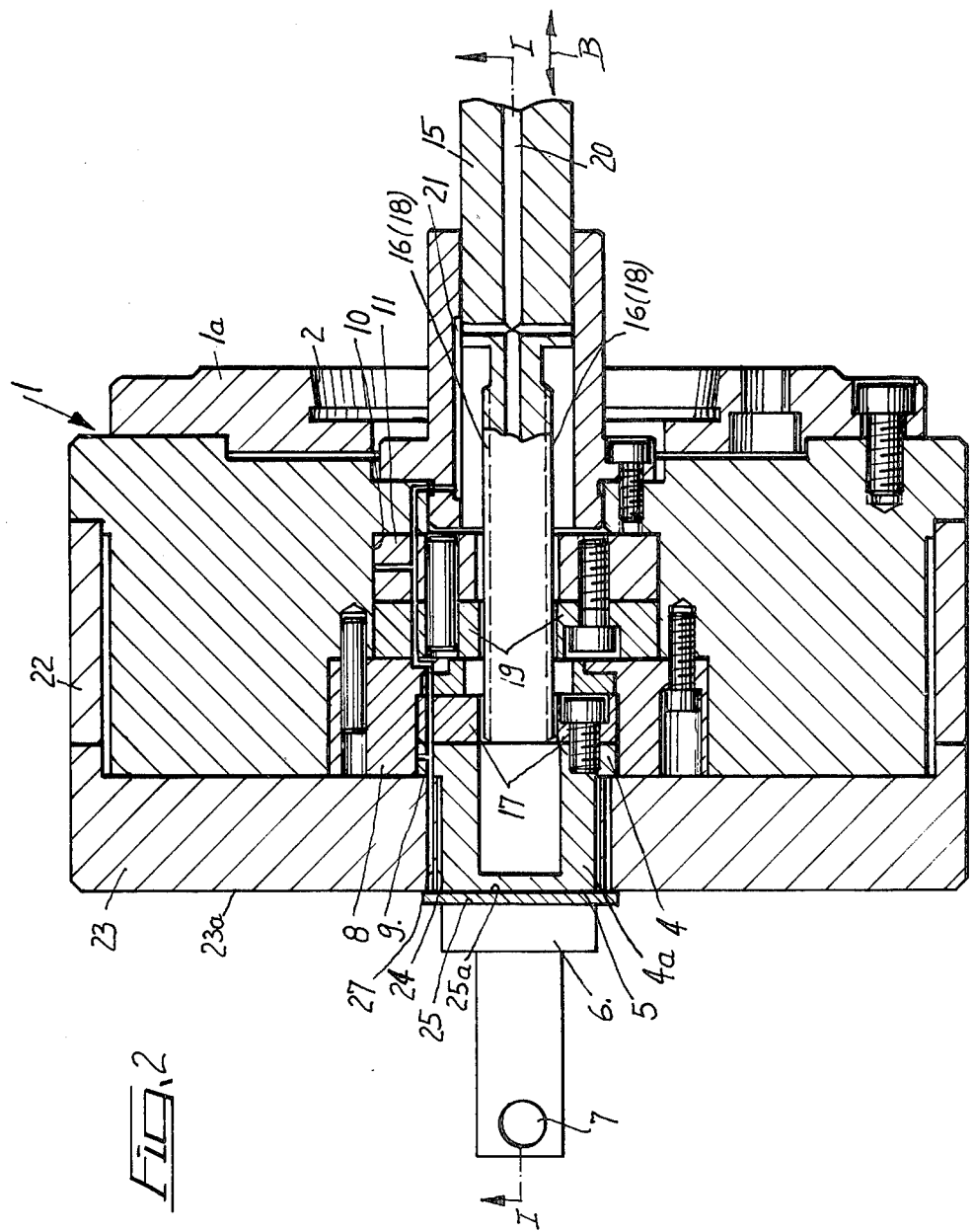

The invention is explained in more detail with reference to an example of embodiment illustrated in the drawing. BRIEF DESCRIPTION OF THE DRAWINGS FIG. 1 shows an axial section through the facing and boring head on the line I—I of FIG. 2, FIG. 2 shows a further axial section on the line II—II of FIG. 1.

DETAILED DESCRIPTIONS

In the drawing, the cylindrical supporting member of the facing and boring head is designated by 1 and may consist of a plurality of parts. At the back, this supporting member comprises a flange plate 1a with a tapered recess 2 which fits on the spindle of a lathe or special machine, this spindle being constructed, for example, in accordance with DIN No. 55021. The supporting member 1 can be secured to the spindle by means of the flange plate 1a.

A slide 4 is disposed at the front of the supporting member 1, perpendicular to the axis of rotation of the supporting member, which coincides with the spindle axis, for displacement in the direction V. At its front, the slide 4 comprises a portion 4a with a mounting surface 5 for a tool holder 6. This tool holder may carry a boring tool 7, for example, or a facing tool not illustrated, according to the nature of the machining to be carried out.

A guide bar 8 with a substantially U-shaped cross-section serves to guide the slide 4. Provided behind the guide bar 8 is a further guide 10 which extends parallel to the slide guide 9 and in which a counterweight 11 is disposed for displacement. The mass of this counterweight including the parts connected to the counterweight corresponds substantially to the mass of the slide 4 plus all the parts connected thereto such as the tool holder 6 and the tool 7.

Provided for the opposite drive of the slide 4 and of the counterweight 11 is an adjusting rod 15 which is provided at each of two diametrically opposite sides with helical teeth 16 and 18. These teeth are at the same angle with respect to the direction of displacement B of the adjusting rod, but are inclined oppositely to one another. Since the teeth are inclined oppositely to the direction of displacement and are provided at both sides of the adjusting rod 15, the teeth cross as can be seen from FIG. 1.

The two sets of helical teeth 16 cooperate with toothed bars 17 which are connected to the slide 4. On the other hand, the toothed bars 19 mesh with the oppositely directed helical teeth 18. The toothed bars 19 are connected to the counterweight. As a result, the effect is achieved that on a displacement of the adjusting rod 15 in the axial direction, the slide 4 and the counterweight 11 are moved by the same amount but in the opposite direction.

In order to achieve as high a working accuracy as possible, the slide 4 and the counterweight 11 are guided with close fits in their guides 9 and 10 respectively. For as high a working accuracy as possible, however, it is also important that slide and counterweight should slide easily in the guides. This presupposes a satisfactory lubrication of the guides. Lubricating oil is supplied to all the guides 9 and 10 through a central bore 20 provided in the adjusting rod 15 and through the lubricating-oil ducts and bores which can be seen from FIG. 2. The mouths of all the the various bores are in communication with oil distributing grooves which are not shown in the drawing for reasons of clarity. The lubricating-oil duct 21 is shown offset by 90%.

The lubricating oil is slung radially outwards by the high centrifugal forces. On the other hand, coolant, turnings and dust could reach the sensitive guides and the gear. In order to prevent the emergence of lubricating oil and the penetration of coolant and turnings, a cylindrical housing 22, which surrounds the slide 4, the counterweight 11, their guides 9, 10 and the gear 16-19, is flange-mounted on the supporting member 1. The housing 22 comprises, at its front adjacent to the tool holder 6, a cover 23 with a plane end face 23a. The cover 23 is further provided with an elongated slot 24 which extends in the direction of displacement V of the slide 4 and which serves for the passage of the portion 4a of the slide. A cover plate 25, which covers the elongated slot 24 completely and which bears with a plane end face 25a against the end face 23a of the cover 23, is provided on the portion 4a of the slide.

This cover plate 25 may appropriately be disposed between the tool holder 6 and the portion 4a of the slide and be connected together with the tool holder 6 by common screws 26. A particularly simple construction is achieved by the fact that the front of the portion 4a of the slide is flush with the end face 23a of the cover 23 and the cover plate 25 is constructed in the form of a plane parallel plate.

Accordingly, it is a particular advantage if lubricating-oil bores 27, to which lubricating oil is supplied through the lubricating-oil supply system already described, are provided in the cover 23. The lubricating-oil bores 27 lead into the contact region between the end face 23a and the plane face 25a of the cover plate 25.

The housing 22 and its cover 23 surround all the important parts of the facing and boring head and prevent an accidental escape of lubricating oil. This escape of lubricating oil is also prevented at the end face 23a by the cover plate 25 which covers the slot 24 in all positions of the slide. Conversely, these parts also prevent the penetration of coolant and turnings into the guides and the gear. Thus these are effectively protected from corrosion and wear. A satisfactory sealing between the cover plate 25 and the cover 23 is particularly important. This is further improved as a result of the fact that the contact region between cover plate 25 and end face 23a is supplied with lubricating oil. The lubricating oil not only lubricates the surfaces in contact but also prevents the penetration of coolant and turnings.

The embodiments of the invention in which an exclusive property or privilege is claimed are defined as follows:

1. A facing and boring head comprising a supporting member in the form of a circular disc to be secured by its back to the spindle of a lathe or the like, a slide which is displaceable radially at the front of the supporting member in a guide extending perpendicularly and symmetrically with respect to the axis of rotation and to which a tool holder can be secured, a counterweight which is displaceable in a guide in the opposite radial direction between the front of the supporting member and the slide and the mass of which corresponds to that of the slide including tool holder and tool, and a gear which causes an opposite and equal radial movement of slide and counterweight depending on a positioning element, wherein the improvement comprises a cylindrical housing which surrounds the slide, the counterweight, their guides and the gear and is flanged-mounted on the supporting member, the housing including, at its front adjacent to the tool holder, a cover with a plane end face and an elongated slot extending in the displacement direction of the slide for the passage of a portion of the slide, and a cover plate which covers the elongated slot completely and bears with a plane face against the end face of the cover, said cover plate being provided on said portion of the slide.

2. A facing and boring head as claimed in claim 1, in which the cover plate is disposed between the tool holder and the portion of the slide.

3. A facing and boring head as claimed in claim 2, in which the cover plate together with the tool holder is secured to the portion of the slide by common screws.

4. A facing and boring head as claimed in claims 2 and 3, in which the front of the portion of the slide is flush with the end face of the cover and the cover plate is constructed in the form of a plane parallel plate.

5. A facing and boring head as claimed in claim 1, including lubricating-oil bores, to which lubricating oil is supplied, provided in the cover and leading into the contact region between its end face and the plane face of the cover plate.

* * * * *